United States Patent [19]

Spitzberg

[11] Patent Number: 4,923,282
[45] Date of Patent: May 8, 1990

[54] MAGNIFYING APPARATUS AND METHOD

[76] Inventor: Larry A. Spitzberg, 5550 N. Braeswood #109, Houston, Tex. 77096

[21] Appl. No.: 315,217

[22] Filed: Feb. 23, 1989

Related U.S. Application Data

[63] Continuation-in-part of Ser. No. 233,958, Aug. 18, 1988, abandoned, which is a continuation of Ser. No. 877,465, Jun. 23, 1986, abandoned.

[51] Int. Cl.$^5$ ............................................... G02B 7/02
[52] U.S. Cl. .................................... 350/245; 350/252; 350/320
[58] Field of Search ............... 350/242, 245, 235, 236, 350/248, 252, 286, 287, 447, 255, 320

[56] References Cited

U.S. PATENT DOCUMENTS

| 2,610,545 | 9/1952 | Davidson | 350/287 |
| 2,954,721 | 10/1960 | Voelker | 350/245 |
| 3,410,635 | 11/1968 | Lockwood | 350/245 |
| 3,675,354 | 7/1972 | Webb | 350/255 |
| 3,819,255 | 6/1974 | Matui | 350/286 |
| 4,058,827 | 11/1977 | Ando et al. | 350/447 |
| 4,099,851 | 7/1978 | Rethore | 350/287 |

Primary Examiner—Bruce Y. Arnold
Assistant Examiner—Loha Ben
Attorney, Agent, or Firm—Vaden, Eickenroht, Thompson & Boulware

[57] ABSTRACT

A magnifying apparatus comprising a prism, a magnifying lens, and a housing for spacing the prism apart from the lens. The prism converts a horizontal image into an image at an angle from the horizontal, and the magnifying lens then magnifies the image for viewing. A method of using the magnifying apparatus for viewing the image of an object on a relatively horizontal surface at an angle from the horizontal is also provided.

14 Claims, 1 Drawing Sheet

MAGNIFYING APPARATUS AND METHOD

This application is a continuation-in-part of co-pending application Ser. No. 233,958, filed on Aug. 18, 1988 now abandoned which is a continuation of co-pending application Ser. No. 877,465, filed on June 23, 1986, now abandoned.

BACKGROUND OF THE INVENTION

The present invention relates to a magnifying apparatus. More particularly, the present invention relates to an apparatus and method for viewing an object such as a book or other printed material on a surface by magnifying the object and viewing the magnified image at an angle from the surface on which the object is located.

Magnifying devices for enlarging an object so that it is easier to see are widely available. To use the currently available magnifying devices, the object to be viewed is placed on a relatively horizontal surface. The magnifier is placed over the object to be viewed. The viewer must then lean forward over the magnifier and the object to be viewed and look down through the magnifier.

For instance, currently available hand held and stand magnifiers require that the magnifier be held or positioned in a plane parallel to the object the user desires to view. The user must bend over to view the object by looking straight down through the magnifier if the object is placed horizontally on a table or desk surface. If the user holds the object to be viewed at an angle from the horizontal, then the magnifier must also be held at an angle in a plane parallel to and spaced apart from the object. The space or distance between the object and the magnifier depends upon the magnification of the lens of the magnifier.

Several paperweight-type magnifiers are manufactured by Selsi Co. Incorporated (40 Veterans Blvd., Carlstadt, N.J. 07072). Most paperweight magnifiers have lens sizes ranging from two to three inches, and powers ranging up to $9\times$, and are compact, but heavy. To use this type of magnifier to maximum advantage, the user must bend over to look directly down through the magnifier.

Magnifiers in frames having a paddle-type handle are distributed by Donegan Optical Co. Inc. (15549 West 108th Street, Lenexa, Kans. 66215) and others. COIL (Combined Optical Industries Limited, 200 Bath Road, Slough, Berkshire SL1 4DW, England) also manufactures rectangular and circular magnifiers supported on plastic molded stands. Those magnifiers suffer the same disadvantage as all other available magnifiers in that the user must bend over and look down through the magnifier to be able to view an object.

Bausch and Lomb attempted to solve this problem by providing an "Around-the-Neck Magnifier", called the "Magni Viewer". That device permits the user to hold an object such as a book under the viewer at an angle from the horizontal, i.e., inclined toward the face of the viewer, without the necessity of also holding the magnifier in the hands. That device has the disadvantage that the user must hold the object to be viewed at exactly an optimum distance from the magnifier to obtain a clear view of the object. Other attempts to solve this problem have involved the use of refracting prisms, but such prisms introduce gross color aberrations and other large distortions into the image.

There is, therefore, a need for a magnifier which does not introduce such aberrations and distortions into the image and which can be used by a person sitting in an upright position and which does not require that the person bend over and look down through the apparatus.

It is an object of the present invention to provide a magnifying apparatus for use for reading which can be placed upon the object to be read such as a book or printed paper and viewed at a normal and comfortable viewing angle by the reader.

It is another object of the present invention to provide a magnifying apparatus for reading which provides a clear, consistent image with little aberration.

A further object of the present invention is to provide a magnifying apparatus for reading which can be easily aligned and used by sliding the bottom of the apparatus over the object such as a book or printed page to be read.

Yet another object of the present invention is to provide a mangifying apparatus for reading which permits viewing by more than one person.

A further object of the present invention is to provide a magnifying apparatus for assistance in the teaching of reading to individuals having impaired vision.

It is another object of the present invention to provide a prism magnifying apparatus for reading a line of print which permits viewing the line of print in both magnified and actual size, as well as the viewing of a magnified image of the leading edge of the prism, to facilitate the alignment of the magnifying apparatus with the line of print.

It is a further object of the present invention to provide a magnifying apparatus comprising a reflecting prism for converting a horizontal image into an image at an angle from the horizontal, means for magnifying an image, and means for spacing the magnifier from the prism.

A further object of the present invention is to provide a method for viewing an object at an angle from the horizontal comprising positioning an apparatus including a reflecting prism and a magnifying lens over an object to be viewed, reflecting an image of the object internally within the prism so that the image is transmitted from the prism at an angle from the horizontal, magnifying the transmitted image, and viewing the magnified image at an angle from the horizontal.

SUMMARY OF THE INVENTION

These objects and advantages are accomplished by providing a magnifying apparatus comprising a non-erecting, reflecting prism for converting a horizontal image into an image at an angle from the horizontal, means for magnifying the image, and means for mounting the prism and the magnifying means in spaced relationship. The prism is preferably one of two prisms contained in a Pechan prism system. The prism converts the image of an object on a relatively horizontal surface into an image at an angle from the horizontal. The apparatus is provided with a straight-edged bottom face which is aligned with a line of print for reading. A method for viewing a magnified image at an angle from the horizontal is also provided comprising positioning an apparatus including a reflecting prism and a magnifying lens over the object to be viewed, reflecting an image of the object and an image of the leading edge of the prism internally within the prism, transmitting the images from the prism at an angle from the horizontal, magnifying the transmitted images, and viewing the transmitted magnified image at an angle from the horizontal along with the unmagnified image of the object.

The magnified image of the leading edge of the prism is used as an internal, magnified line guide.

DETAILED DESCRIPTION OF THE PREFERRED EMBODIMENT

Figure 1:
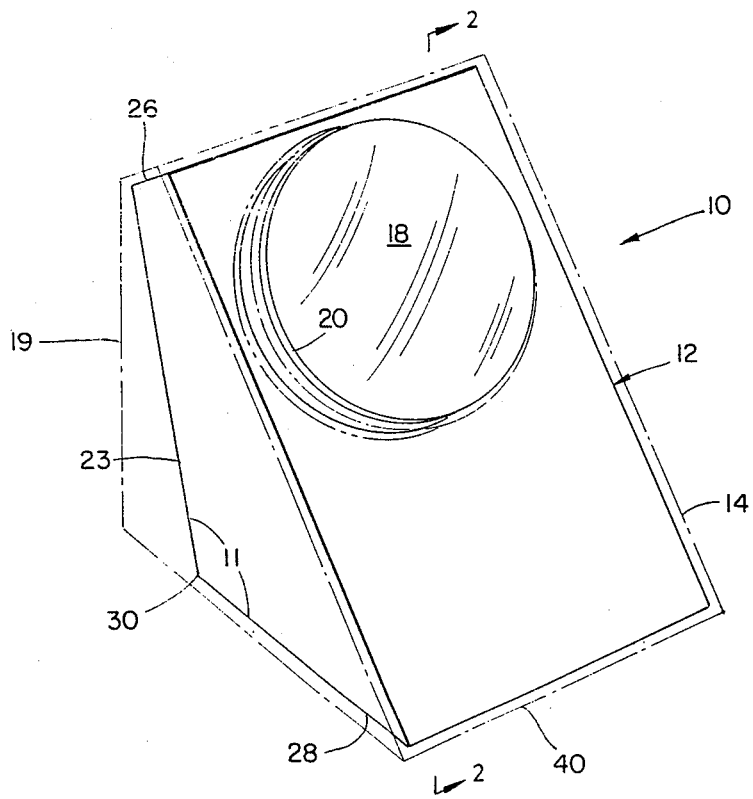
FIG. 1 is a perspective view of an apparatus constructed according to the teachings of the present invention.

The magnifying apparatus of the present invention is indicated generally at reference numeral 10. Magnifying apparatus 10 is constructed of a prism 12 which is preferably a non-erecting, reflecting prism having emergent face 14, back face 16, and bottom face 28. Emergent face 14 is the face opposite the greatest angle 11 of the prism. In the case of the preferred prism, which is one of two prisms in a Pechan prism system, that angle is a $112\frac{1}{2}°$ angle. The remaining angles of the preferred prism are $22\frac{1}{4}°$ and the 45° angle at the leading edge 40 of prism 12, e.g., the substantially straight edge formed by the angle between emergent face 14 and bottom face 28. Those angles are set out by way of exemplification and not limitation. Referring to the angle at the leading edge 40 of prism 12 because that angle governs the angle at which an image is viewed with respect to the horizontal surface 36, non-erecting prisms having angles at the leading edge 40 of between about 40° and about 60° are suitable for use in connection with the apparatus 10. Non-erecting prisms having angles at the leading edge 40 of between about 45° and about 50° are presently preferred. Reference is made to "non-erecting" prisms because a line of print on a page is already erect, e.g., need not be inverted, or "erected", for viewing. Therefore, prism 12 is referred to as a non-erecting, reflecting prism (e.g., a non-roof prism).

Housing 19 is provided with an integral flange 20, and lens 18 is mounted in flange 20. Housing 19 is shown in shadow lines in FIGS. 1 and 2 for purposes of clarity. In a presently preferred embodiment, lens 18 is a standard plus objective lens available from any optical supply company. Housing 19 is constructed of any suitable material, such as plastic, forged steel, aluminum, copper, brass, or other material. Housing 19 encloses prism 12 and lens 18, and holds prism 12 and lens 18 in spaced relationship adjacent emergent face 14. In an alternative embodiment, lens 18 can be spaced adjacent the emergent face 14 of prism 12 by a lens ring (not shown) mounted directly to emergent face 14, thus making housing 19 unnecessary.

The remaining faces of prism 12 are sides 23, roof face 26, and bottom face 28. In a presently preferred embodiment, back face 16 is silvered to reflect the image of an object to be viewed internally within the prism, and all other faces are unsilvered. Side faces 23, bottom face 28, and roof face 26 are polished. The silvering can be of aluminum, silver or other material capable of reflecting light within prism 12. In the case of emergent face 14, the angle of incidence of light exceeds the critical angle of the prism so light rays are reflected internally without silvering. Prism 12 thus reflects an image of an object to be viewed internally within the prism, permitting the image to be transmitted through emergent face 14 at an angle from the horizontal.

In a presently preferred embodiment of the magnifying apparatus 10, prism 12 is constructed of crown glass, having an optical density of about 1.532, although other indices of glass may be used. Lens 18 may be constructed of plastic.

Figure 2:
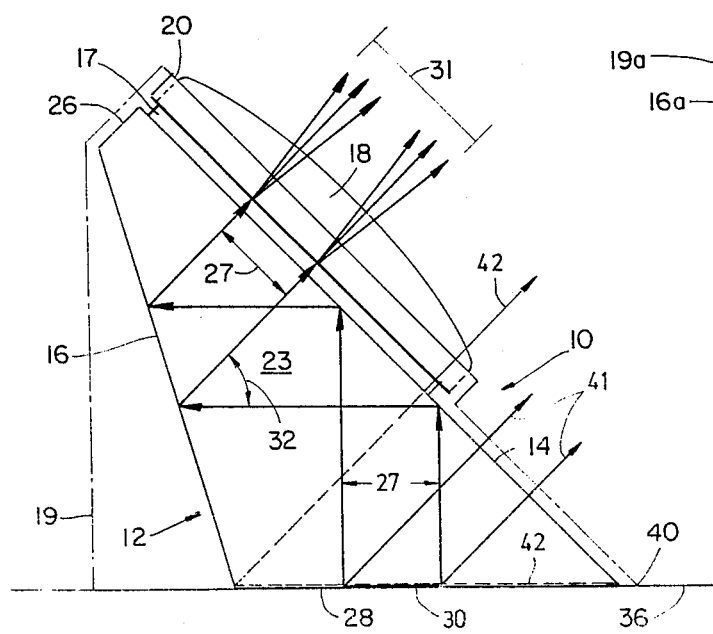
FIG. 2 is a schematic representation of a sectional view of the apparatus of FIG. 1 taken along the line 2—2 in FIG. 1 showing the path taken by light through the apparatus.

FIG. 2 is a schematic representation of the path which the image of an object 30 takes through the magnifying apparatus 10. The image 27 of object 30 passes through the bottom face 28 of the prism 12, is internally reflected from emergent face 14, and passes through the prism 12 again to be reflected from back face 16. Back face 16 also reflects image 27, causing image 27 to traverse the prism 12 a third time. Image 27 is then transmitted through emergent face 14 and lens 18, and viewed by a user as a magnified image 31 at an angle 32 from the horizontal. Likewise, the image of the leading edge 40 of prism 12 (which is used as an internal magnified line guide) passes through prism 12 along the path shown in dotted lines at reference numeral 42, is reflected from back face 16 to traverse prism 12, and emerges through emergent face 14 and lens 18 to be viewed at an angle 32 from horizontal surface 36 along with the magnified image 31 of object 30. For purposes of clarity, the dotted line 42 is shown slightly above the line representing object 30, it being understood that when prism 12 rests on surface 36, it is impracticable to show the actual path of the image of leading edge 40 through prism 12.

Depending upon the size of the prism 12 used and magnifying power of lens 18, magnifications in the range of 2× to 9× are achieved. In a presently preferred embodiment, the dimensions of emergent face 14 are about 52 mm×46 mm. The dimension of the lens 18 is approximately equal to or smaller than the 46 mm dimension of the emergent face 14 and has a focal length of about 60 millimeters. Those skilled in the art will recognize that these dimensions are set out by way of examplification and that the invention is not limited to the use of a lens and an emergent face having only those dimensions. In the presently preferred embodiment, the space 17 between lens 18 and emergent face 14 is about two millimeters across. The presently preferred embodiment of the magnifying apparatus 10 magnifies to about 5×. The magnifying apparatus 10 can be constructed in 3×, 5×, 7×, or 9× embodiments by using a smaller prism 12 with a magnifying lens 18 of greater magnification or a larger prism 12 with a magnifying lens 18 of lesser magnification. Lens 18 is mounted to emergent face 14 at a position that also allows the reflected magnified image of the leading edge 40 of prism 12 to be viewed therethrough, thereby facilitating the reading of a line of print by making possible the alignment of the magnified image 31 of the line of print 30 and the magnified image of the leading edge 40.

Figure 3:
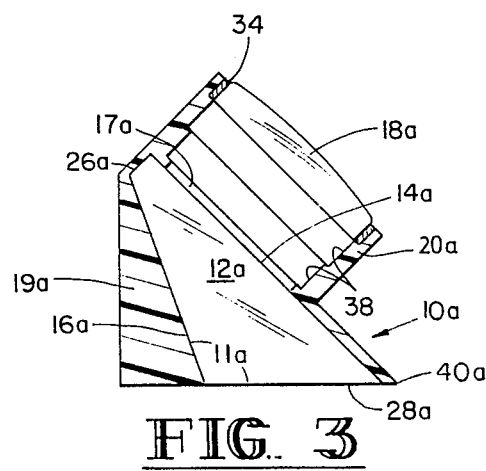
FIG. 3 is a sectional view similar to the sectional view of FIG. 2 of an alternative embodiment of an apparatus constructed according to the teachings of the present invention.

An alternative embodiment of the present invention is constructed as shown in FIG. 3. Magnifying apparatus 10a is provided with a housing 19a having flange 20a for receiving lens 18a. Lens 18a is mounted in a lens ring 34 made of plastic or other suitable material. Lens ring 34, having lens 18a mounted therein, is received within flange 20a adjacent to emergent face 14a of prism 12a. Flange 20a is provided with serrations 38, threads, or other suitable means for receiving lens rings 34 of different diameters to releasably mount lens 18a of different diameters in properly spaced relationship to prism 12a. Lens ring 34, having lens 18a mounted therein, can be snapped in or out of the serrations 38 in flange 20a depending upon the magnification desired. Space 17a between magnifying lens 18a and emergent face 14a is of greater dimension for more powerful lenses 18a, and of smaller dimension for less powerful lenses 18a. Flange 20a receives a lens 18a of larger diameter at a greater spaced distance from emergent face 14a, and a smaller lens 18a at a lesser spaced distance from emergent face 14a.

The apparatus of the present invention is used by the following method. The object 30 to be viewed, such as a book or other printed material, is placed on a horizontal surface 36 and the bottom face 28 of prism 12 is placed in contact with the material to be viewed. The image 27 of object 30, as well as the image of the leading edge 40 of prism 12, is reflected internally within prism 12, transmitted through emergent face 14 of prism 12, and magnified by lens 18. The user, sitting comfortably erect, views the magnified image 31, as well as the magnified image of leading edge 40, at an angle 32 from the horizontal, aligning the two magnified images to facilitate the reading of the line of print.

The apparatus of the present invention is advantageously used for reading by placing the material to be read on a relatively horizontal surface 36 such as a desk or table, aligning the leading edge 40 of reflecting prism 12 with a line of print, and sliding edge 40 along the line of print as the viewer desires, keeping edge 40 in a horizontal plane parallel to the line of print. The magnified image of the printed material and the magnified image of the leading edge 40 are viewed through the magnifying apparatus 10 at an angle 32 from the horizontal surface 36, the angle 32 being determined by the angle between emergent face 14 and bottom face 28 at leading edge 40. For teaching of reading, the book or other printed material may be viewed directly through emergent face 14 as shown by the arrows at reference numeral 41 by both teacher and student at the same time.

Although the invention has been described in terms of the foregoing preferred embodiment, this description has been provided by way of description only, and is not to be construed as a limitation of the invention, the scope of which is limited only by the following claims:

What is claimed is:

1. A magnifying apparatus comprising:
   a non-erecting reflecting prism having an emergent face, a substantially flat bottom for resting on a substantially horizontal surface, and a substantially straight leading edge for alignment with a line of print on a page resting on the horizontal surface, the emergent face of said reflecting prism angled at an angle of from about 40° to about 60° when said reflecting prism rests on the horizontal surface;
   a magnifying lens; and
   means for mounting said magnifying lens over a portion of the emergent face of said reflecting prism, whereby the image of the leading edge of said reflecting prism and the image of the line of print are reflected within said reflecting prism and then transmitted at an angle of from about 40° to about 60° with respect to the horizontal surface on which said reflecting prism rests, through said magnifying lens for viewing as magnified images, and the image of the line of print is transmitted without being reflected through another portion of the emergent face for viewing as an image of actual size to facilitate the reading of the line of print.

2. The magnifying apparatus of claim 1 wherein said prism comprises a Pechan prism.

3. The magnifying apparatus of claim 1 wherein the image of the line of print is transmitted and reflected at approximately a 45° angle with respect to the horizontal surface.

4. The apparatus of claim 1 wherein said mounting means comprises a housing for holding said magnifying lens in spaced relationship to said reflecting prism adjacent the emergent face thereof.

5. The magnifying apparatus of claim 1 wherein the image of the line of print is transmitted and reflected at an angle of between about 45° and about 50° with respect to the horizontal surface.

6. A magnifying apparatus comprising:
   a non-erecting reflecting prism having an emergent face and a bottom face, the bottom face being substantially flat for resting on a printed material placed on a substantially horizontal surface, and a substantially straight leading edge formed between the emergent face and the bottom face of said reflecting prism for alignment with a line of print on the printed material on the horizontal surface;
   a magnifying lens; and
   means for mounting said magnifying lens over a portion of the emergent face of said reflecting prism, whereby the image of the line of print is both (1) reflected within said reflecting prism and then transmitted at an angle with respect to the horizontal surface on which said reflecting prism rests, through said magnifying lens for viewing as magnified image, and (2) transmitted without being reflected through another portion of the emergent face, for viewing as an image of actual size, and the image of the leading edge is reflected within said reflecting prism and then transmitted through said magnifying lens to facilitate alignment of the magnified image of the line of print with the magnified image of the leading edge for reading the line of print.

7. The apparatus of claim 6 wherein said mounting means comprises a housing.

8. The apparatus of claim 6 wherein said housing is provided with a flange having serrations therein for releasably receiving magnifying lenses of different powers.

9. The apparatus of claim 6 wherein said reflecting prism comprises a Pechan prism.

10. The apparatus of claim 6 wherein the images of the line of print and the leading edge are reflected at an angle of from about 45° to about 50° with respect to the horizontal surface.

11. The apparatus of claim 6 wherein the angle between the emergent face and the bottom face of said reflecting prism is 45°.

12. The apparatus of claim 6 wherein said mounting means holds said magnifying lens in spaced relationship to said reflecting prism adjacent the emergent face of said reflecting prism.

13. A method for viewing the image of a line of print at an angle from the horizontal comprising;
   placing printed material having said line of print thereon on a substantially horizontal surface;
   resting a reflecting prism having a substantially flat bottom face, an emergent face, and a substantially straight edge therebetween on the printed material;

reflecting the images of the line of print and the straight edge of the reflecting prism internally within the prism and through a portion of the emergent face of the prism at an angle of from about 40° to about 60° with respect to the horizontal surface;

magnifying the images transmitted through said portion of the emergent face;

viewing the magnified image of the line of print and the magnified image of the straight edge of the prism; and viewing the actual size image of the line of print through another portion of the emergent face of the prism.

14. The method of claim 13 additionally comprising aligning the magnified image of the line of print with the magnified image of the straight edge of the prism to facilitate reading the line of print.

* * * * *